W. P. JONES.
BREAD-MACHINE.

No. 177,849. Patented May 23, 1876.

Witnesses:
J. P. Theodore Laug.
James Martin Jr.

Inventor:
William P. Jones
by Mason Fenwick Lawrence
Attys.

UNITED STATES PATENT OFFICE.

WILLIAM P. JONES, OF GEORGETOWN, ASSIGNOR OF ONE-HALF HIS RIGHT TO JOHN M. HOUSTON, OF MILLSBOROUGH, DELAWARE.

IMPROVEMENT IN BREAD-MACHINES.

Specification forming part of Letters Patent No. 177,849, dated May 23, 1876; application filed March 14, 1876.

*To all whom it may concern:*

Be it known that I, WILLIAM P. JONES, of Georgetown, in the county of Sussex and State of Delaware, have invented a new and useful Improvement in Dough-Kneading Machines, which improvement is fully set forth in the following specification, reference being had to the accompanying drawings, in which—

Figure 1:
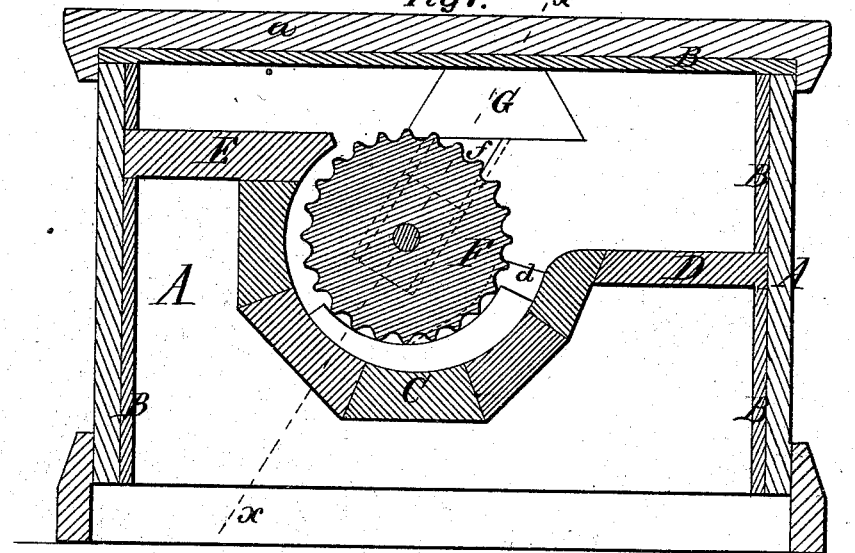
Figure 2:
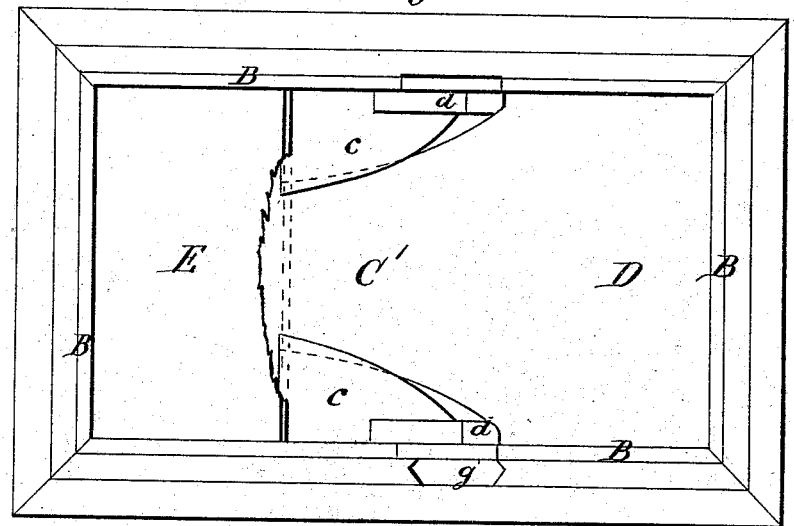
Figure 3:
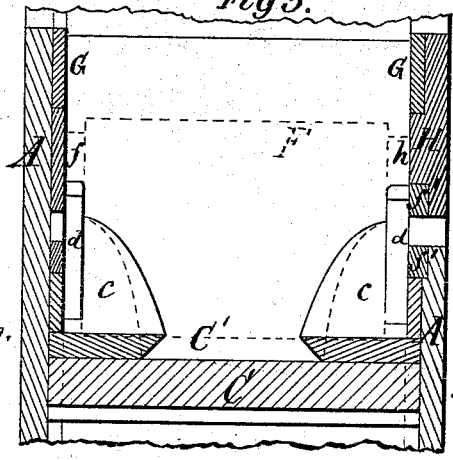
Figure 4:
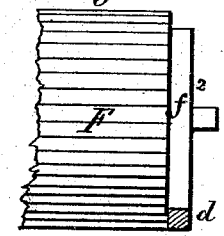

Figure 1 is a vertical longitudinal central section of my improved dough-kneading machine. Fig. 2 is a top view of the same, the revolving cylinder being removed; and Fig. 3 is a central cross-section in the line $x\ x$ of Fig. 1. Fig. 4 exhibits the end packing of the kneading-cylinder.

My invention relates to a rotary dough-kneading machine, wherein the mass of dough is placed and carried around between a revolving roller and a stationary concave, the surfaces of which roller and concave are so placed with respect to one another and constructed that they gradually compress the dough in lateral, partly vertical, and horizontal directions as it passes to the discharging termini of said surfaces.

The nature of my invention consists in certain constructions, combinations, and arrangements of parts, as hereinafter described and specifically claimed, whereby a very simple and effective dough-kneading machine, operating on the above-mentioned plan, is produced at a slight cost.

To enable others skilled in the art to understand my invention, I will proceed to describe it.

In the drawings, A represents a box, which may be provided with a cover, $a$. The box A and the cover $a$ are provided with a lining, B, of pine wood, or any other suitable material which does not promote souring, and is easily kept clean. Into the said lining B the cylindrical bottom C and the straight horizontal boards D E are inserted, transversely to the box A. A corrugated or fluted cylinder, F, is so mounted in the lining B by means of the journal-boxes $f^1\ f^1$ as to be eccentric to the cylindrical bottom C, the distance between both being wider near the board D, and gradually diminishing toward the opposite side. The bottom C is provided with two lateral guide-blocks, $c$, for the purpose of forming a flaring compressing-chamber, C', on it. These blocks advance toward one another as the distance between the cylinder F and the bottom C becomes less, and they bear against the said cylinder. The opposing sides of these blocks are underbeveled, or dovetail gradually toward their termini, as seen in Figs. 2 and 3. Two vertical guide-blocks, $d$, fastened to the lining B, and bearing on cylindrical reductions $f^2$ on the cylinder F, as seen in Fig. 4, serve to keep the dough from crowding between the ends of the cylinder F and the lining B. The journal-box $f^1$ is inserted into an inclined dovetail groove formed by the cutting away of the lining B, and a trapezoidal thrust-block, G, also inserted into the said lining and above the block $f$, prevents it from being lifted. The opposite journal-box $f^1$ is lodged in a similar groove in the lining B; but as it is necessary to have a slot in one side of the box A, to enable the operator to lift the long or crank end of the axle of the cylinder F from the box when desirable, the lining B and the outer board of the box are together provided with a double dovetail groove, as seen at $g$ in Fig. 2. A slab, H, is fitted in the outer part of the said groove, extending from the top of the box A down to the axle of the cylinder. The said slab H has a projection, $h$, which extends into the inner part of the groove $g$, and rests on the journal-box $f^1$. A thrust-block, G, of the same construction as the one on the opposite side of the box A, rests on top of the said projection $h$, and locks the slab H and the journal-box $f^1$. To remove the cylinder F from the box A the blocks G are taken out from their recesses, the slab H is then taken from the groove $g$, and then the cylinder F, with the journal-boxes $f^1\ f^1$, is raised up. The journal-box $f^1$ breaks joint with the slab H at the center of the journal, and the slab H breaks joint with the upper end of the journal-box $f^1$, and with the base of the block G, by means of the projection $h$, so that thereby a very solid packing around the journal and and along the slot $g$ is effected.

Operation: The raw dough is deposited on the platform D in such quantity that it reaches the revolving cylinder, and is drawn, by the unevenness of its surface, down into the space between said cylinder and the bottom C. The lower part of the dough has a tendency to stick to the stationary bottom; but the top part is continually pushed forward by the cylinder, and thus a combination of faster and slower motion is the result. Thus the mixing and kneading of the dough becomes more perfect as the pressure increases with the diminution of the area between the cylinder F, the bottom C, and the guide-blocks $c$; but so far amounts only to a horizontal kneading. A lateral and partly vertical kneading by the overlapping of the dough at both sides is effected by the gradually-inclining sides of the guide-blocks $c$. The combination of the horizontal and lateral and partly vertical mode of kneading gives the dough, as it passes from the termini of the guide-blocks $c$, a uniform texture, so that it passes through the remaining part of the concave C without breaking, and is finally discharged as a continuous sheet, which may be allowed to go through the same operation again until its consistency and uniformity are satisfactory, when it may be passed off the cylinder and deposited on the platform E, and the effect is very similar to the kneading of dough with the human hands.

It will be seen from the drawings that the fluted roller is arranged with its highest part below the top edge of the box, and that the platform E is about on a plane with the highest part of the roller, and the platform D about on a plane with the horizontal axis of the roller, and that all these parts are inclosed within the box and covered by a top, and that thus a free space between the platforms, the roller, and the top of the box is afforded for the dough to move in, with the top closed while the dough is being kneaded, and that the largest part of this space is between the front of the roller, the top of the box, and the platform D, which is the point where the mass of dough is placed to be fed to the roller and concave.

Having thus described my invention, what I claim, and desire to secure by Letters Patent, is—

1. The fluted roller F, in combination with a box, A, having a cover, $a$, platform E, an eccentric concave, C, and a platform, D, said platforms being placed below the cover some distance, and one being located about in the plane of the axis of the roller, and the other nearly in the plane of its upper surface, so that the dough can be placed upon the platform D within the box and closed in against dust by the cover $a$ while it is being kneaded, and as fast as kneaded can be deposited upon the platform E under the cover, substantially as described.

2. The concave, constructed with a flaring channel, C', in it, substantially as described.

3. The combination of the roller and the eccentric concave, having the flaring channel C', substantially as described.

4. The kneading-box, having a flaring channel formed by the underbeveled shoulders or wings $c\ c$, substantially as described.

5. The box A, having the lining B, the concave C, the guides $c$, and packing-blocks $d$, substantially as described.

6. The guide-blocks $c$, diminishing in thickness, but increasing in width, and having their opposing sides change from a vertical position at the greatest thickness to an inclined position at the least thickness of the said guide-blocks, substantially as and for the purpose set forth.

7. In a dough-kneading machine, the combination of the journal-box $f'$, the slab H, having a projection, $h$, and the locking-block G, substantially as and for the purpose set forth.

WILLIAM P. JONES.

Witnesses:
PHILIP C. PENNEL,
J. W. FOOKS.